United States Patent [19]

Schmidt et al.

[11] Patent Number: 4,934,766

[45] Date of Patent: Jun. 19, 1990

[54] EQUIPMENT STAND, PARTICULARLY FOR DENTAL IMPLEMENTS

[75] Inventors: Helmut Schmidt; Anton Bodenmiller, both of Leutkirch; Alfred Straka, Isny, all of Fed. Rep. of Germany

[73] Assignee: Kaltenbach & Voight GmbH & Co., Biberach/Riss, Fed. Rep. of Germany

[21] Appl. No.: 123,773

[22] Filed: Nov. 23, 1987

Related U.S. Application Data

[62] Division of Ser. No. 666,883, Oct. 31, 1984, Pat. No. 4,730,880.

[30] Foreign Application Priority Data

Nov. 2, 1983 [DE] Fed. Rep. of Germany ....... 3339656

[51] Int. Cl.⁵ ............................................ A47B 67/02
[52] U.S. Cl. ..................................... 312/248; 108/50; 248/285; 312/209; 312/223; 433/32
[58] Field of Search ............... 312/209, 223, 236, 237, 312/23, 50, 245, 246, 247, 248; 108/23, 50; 248/121, 558, 122, 125, 407, 408, 283, 412, 296, 337, 127, 158, 354.6, 278, 279, 285, 281.1; 433/25, 32, 49, 77; 431/153, 343, 256; 211/162

[56] References Cited

U.S. PATENT DOCUMENTS

| | | | |
|---|---|---|---|
| 466,464 | 1/1892 | Hood et al. ...................... | 248/281.1 |
| 553,572 | 1/1896 | Stafford .......................... | 433/32 X |
| 618,421 | 1/1899 | Kirkwood ....................... | 433/32 |
| 619,445 | 2/1899 | Smith .............................. | 248/281.1 |
| 724,434 | 4/1903 | Cavanagh ....................... | 431/343 |
| 790,207 | 5/1905 | Holtz .............................. | 248/281.1 |
| 1,000,785 | 8/1911 | Cunningham et al. ............ | 433/32 |
| 1,719,306 | 7/1929 | Pieper et al. .................... | 433/32 X |
| 1,795,296 | 3/1931 | DeZeng .......................... | 248/285 |
| 1,912,287 | 5/1933 | Lundell ........................... | 248/285 |
| 2,301,661 | 11/1942 | Wiedenhoeft .................. | 248/121 X |
| 2,970,701 | 2/1961 | Fetter ............................. | 248/121 |
| 3,366,430 | 1/1968 | Diedrich ......................... | 248/285 X |
| 3,399,856 | 9/1968 | Pecaut ............................ | 211/162 X |
| 3,454,252 | 7/1969 | Morgan et al. .................. | 248/121 X |
| 3,708,203 | 1/1973 | Barecki et al. .................. | 248/408 X |
| 4,026,026 | 5/1977 | Richardson ..................... | 433/77 X |
| 4,053,193 | 10/1977 | Grover et al. ................... | 433/77 X |
| 4,181,037 | 1/1980 | Boon et al. ...................... | 312/125 X |
| 4,234,150 | 11/1980 | Mee et al. ....................... | 248/281.1 |
| 4,306,749 | 12/1981 | Deloustal ........................ | 248/408 X |

FOREIGN PATENT DOCUMENTS

| | | |
|---|---|---|
| 8258886 | 2/1961 | Fed. Rep. of Germany . |
| 1910500 | 10/1964 | Fed. Rep. of Germany . |
| 6913932 | 9/1970 | Fed. Rep. of Germany . |
| 7428439 | 3/1975 | Fed. Rep. of Germany . |
| 2554477 | 6/1977 | Fed. Rep. of Germany . |
| 7825167 | 12/1978 | Fed. Rep. of Germany . |
| 7908672 | 9/1979 | Fed. Rep. of Germany . |
| 2821969 | 11/1979 | Fed. Rep. of Germany ........ 433/77 |
| 3106255 | 10/1982 | Fed. Rep. of Germany . |
| 579856 | 1/1973 | Switzerland . |

OTHER PUBLICATIONS

Martin Gasbrenner, Lot-und Schmelzpistolen, Cover page, p. 7, and end sheet.
"Dental-Gerate" Universal Machine D-FU222, Harnisch Rieth, 5/1983, 2 pages.
Siemens, Rona 2000E, 2 pages.
EMDA, Support Stand, 6 pages.
Dental Products Report, Jan./Feb. 1981, cover page.

*Primary Examiner*—Peter A. Aschenbrenner
*Assistant Examiner*—Thomas A. Rendos
*Attorney, Agent, or Firm*—Scully, Scott, Murphy & Presser

[57] ABSTRACT

An equipment stand, in particular for dental implements, which consists of a carrier possessing holders for the dental implements or instruments. A stand which extends in a vertical direction, concurrently forms the carrier possessing the implement holders, so as to thereby eliminate a separate component as a carrier in the form of a cross-bar, and consequently avoids a complex construction. Furthermore, through a superimposed arrangement of the implement holders there is afforded a good overview of the implements which are located in the holders.

8 Claims, 7 Drawing Sheets

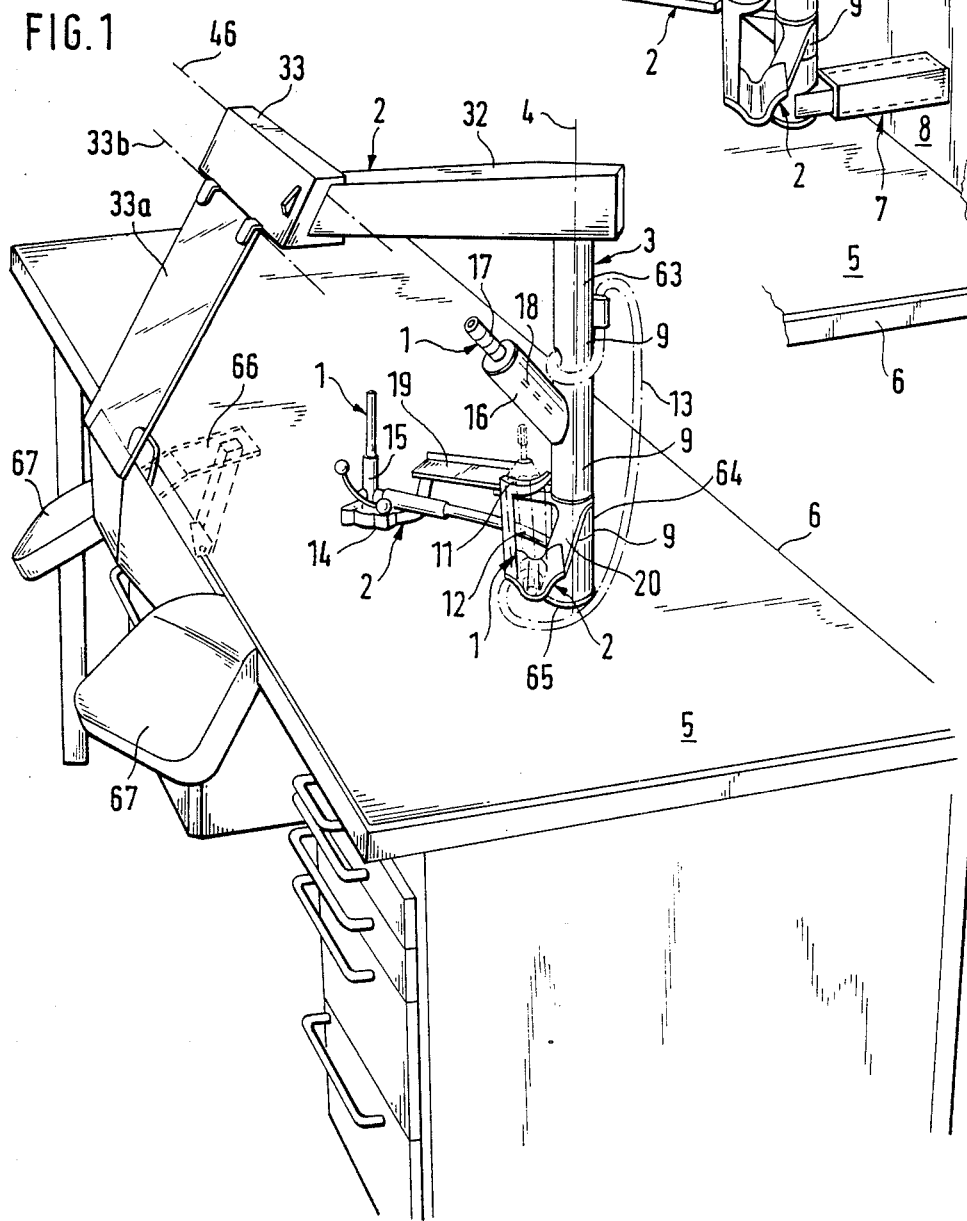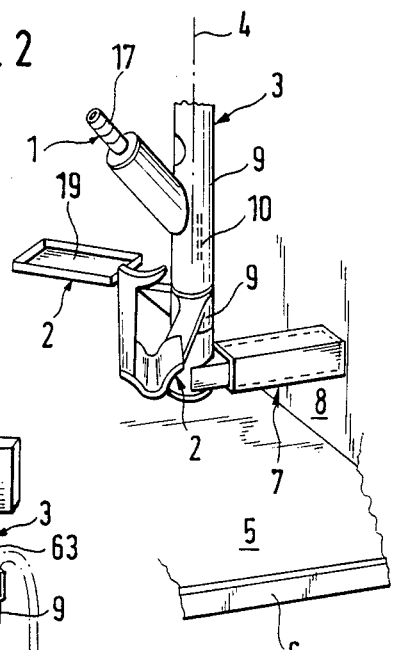

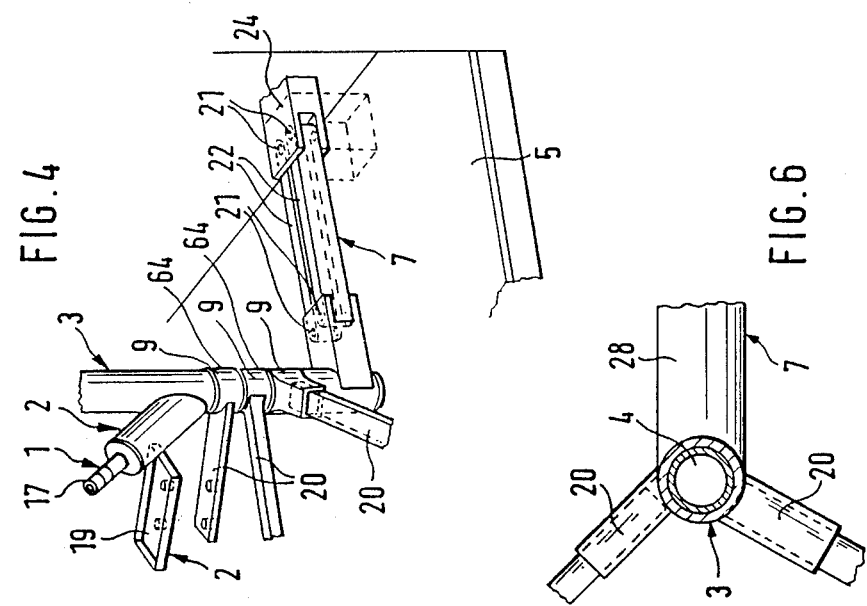
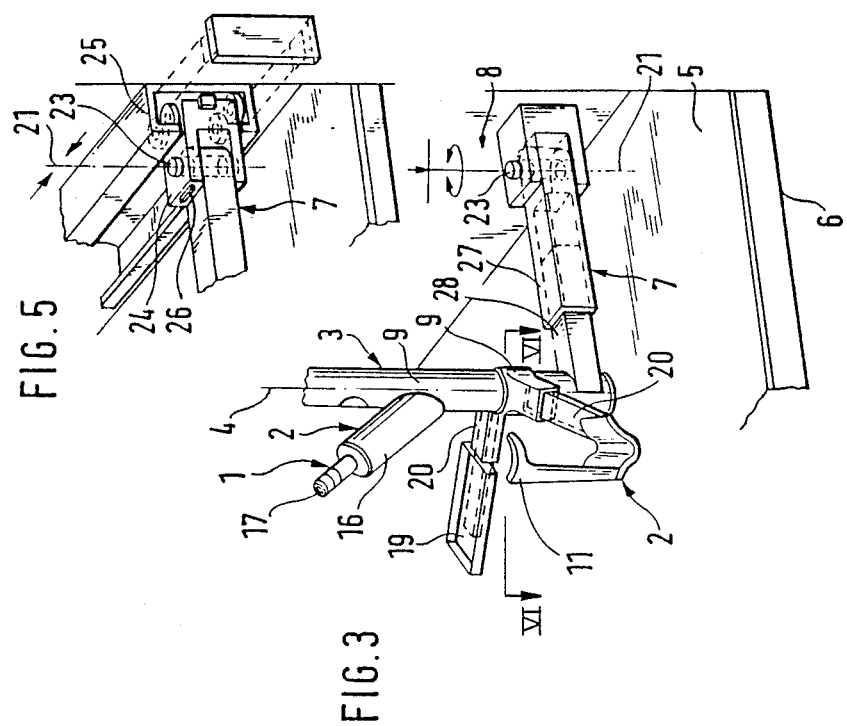

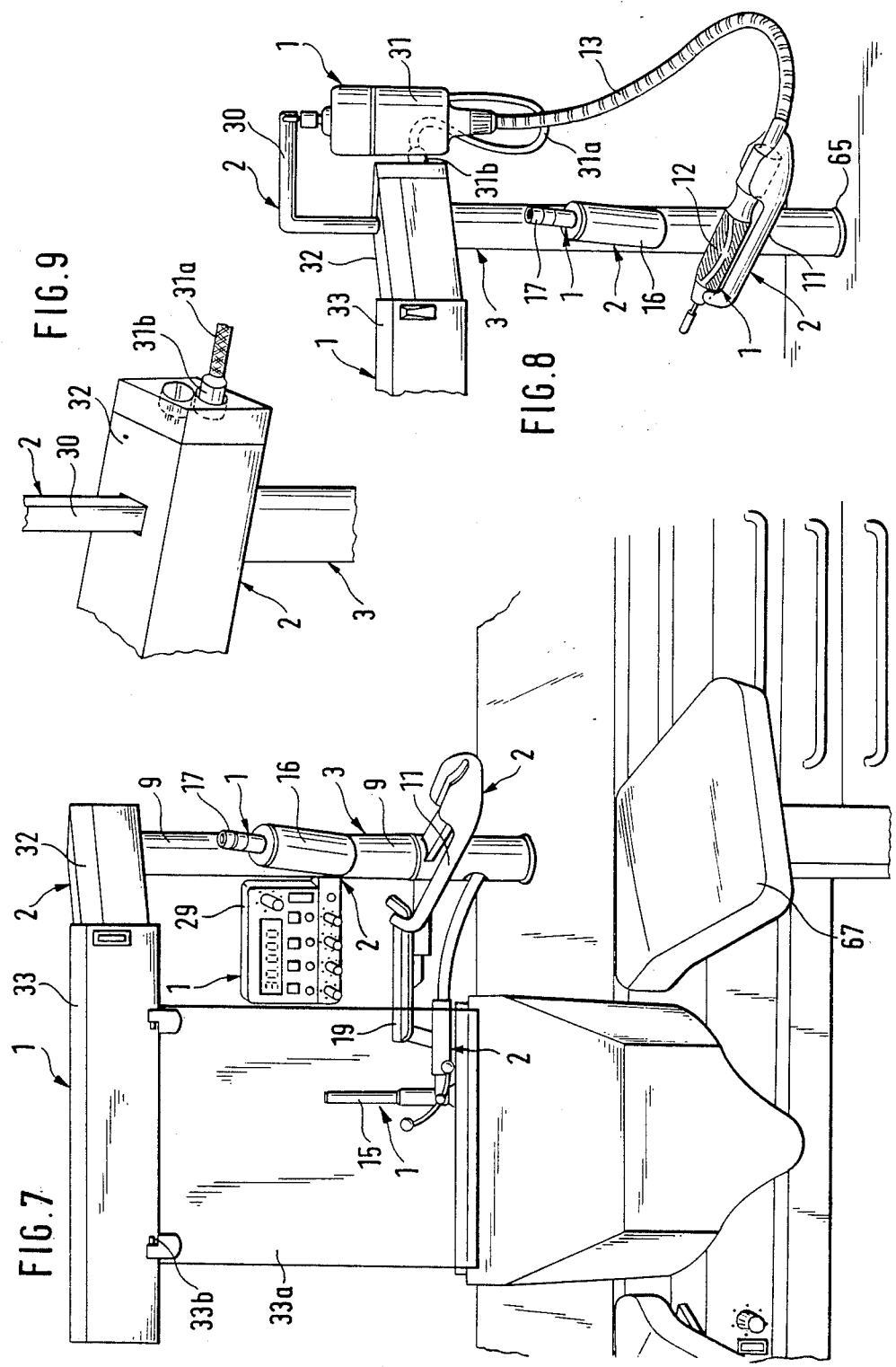

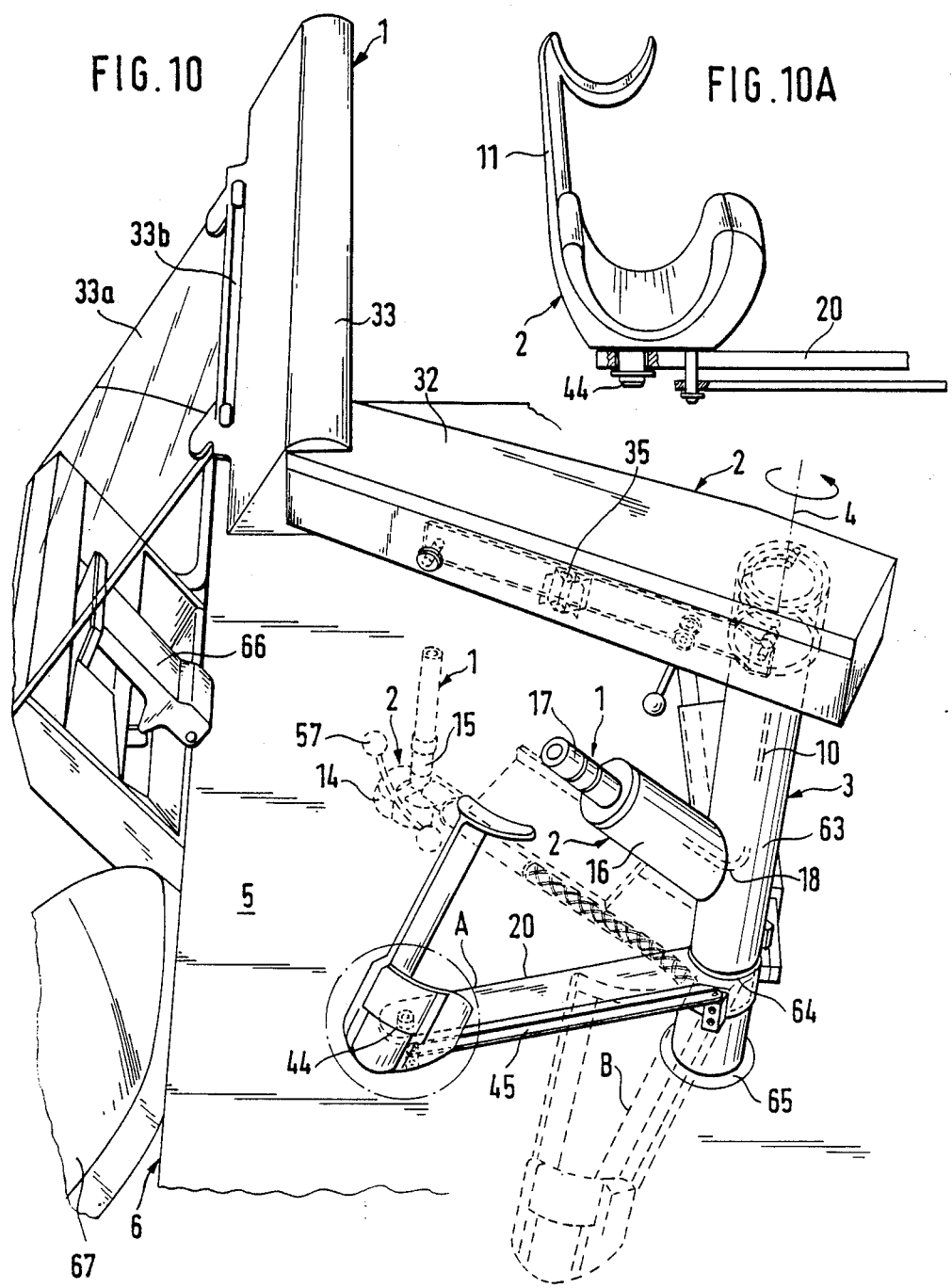

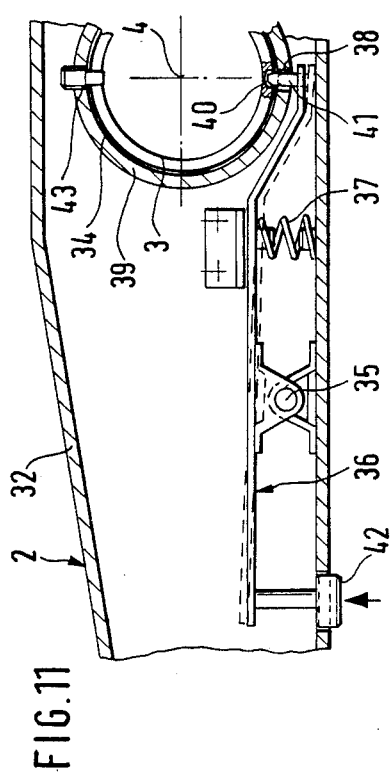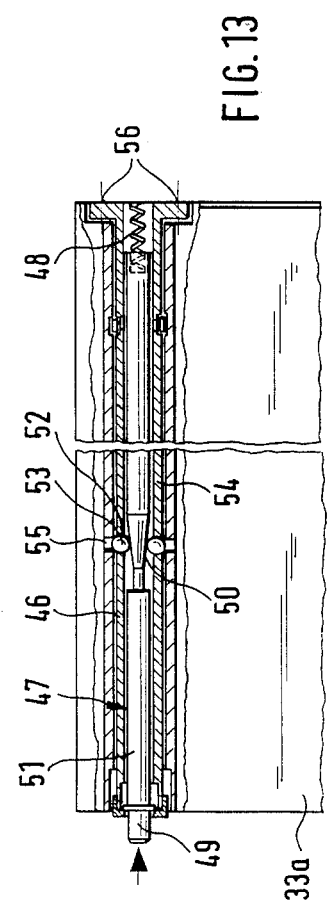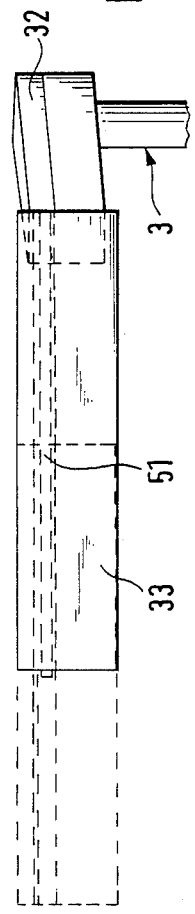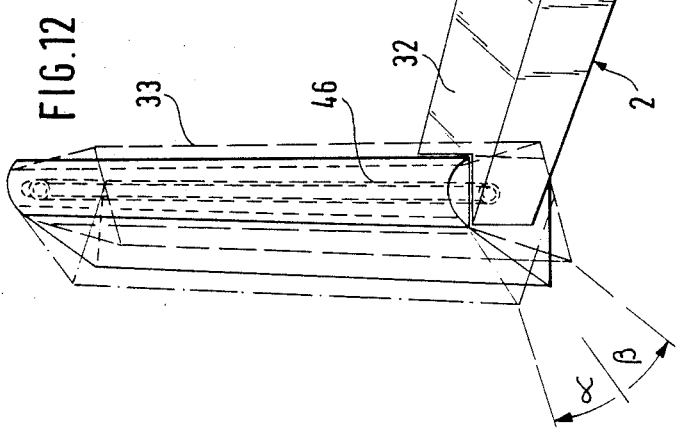

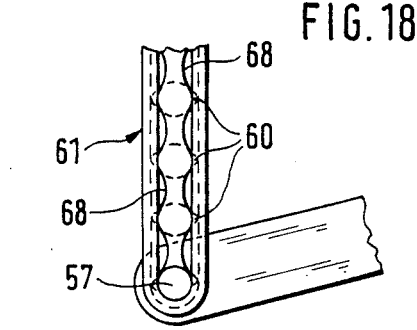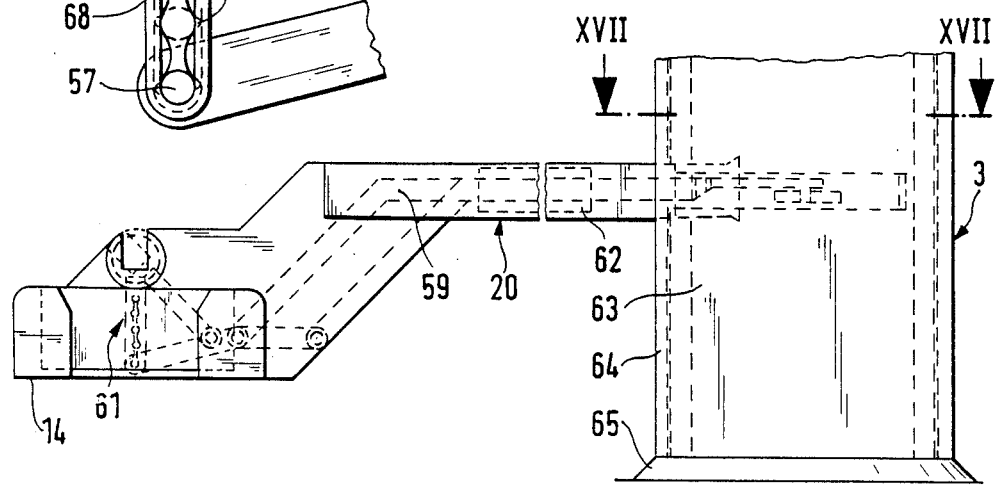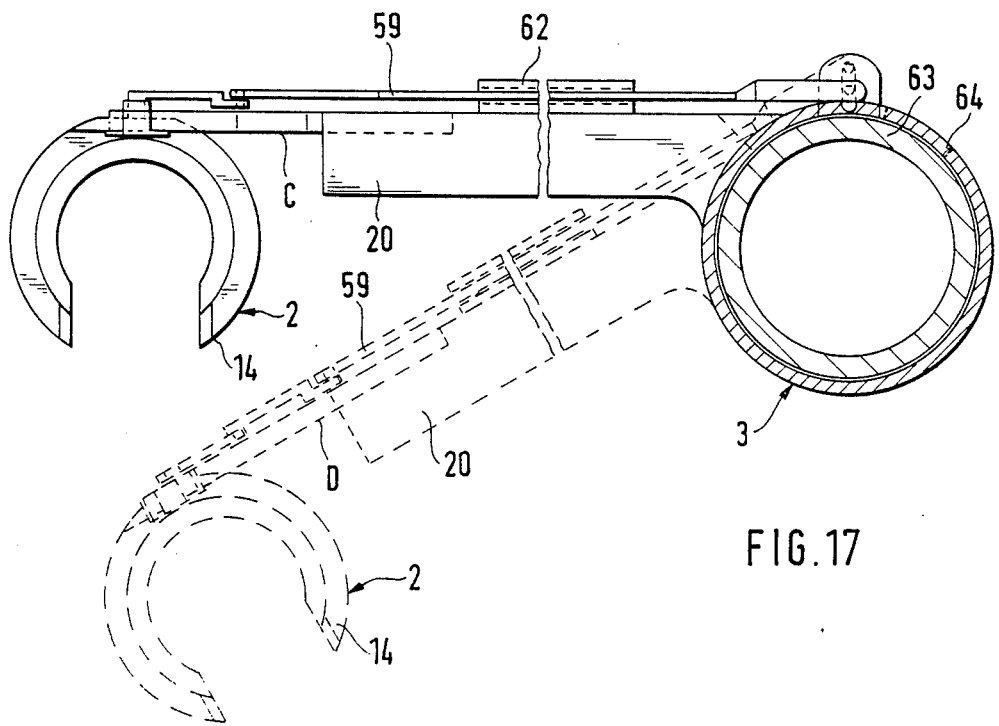

EQUIPMENT STAND, PARTICULARLY FOR DENTAL IMPLEMENTS

CROSS-REFERENCE TO RELATED APPLICATIONS

This application is a divisional application of Ser. No. 666,883, filed on Oct. 31, 1984 Pat. No. 4,730,880.

BACKGROUND OF THE INVENTION

1. Field of the Invention

The present invention relates to an equipment stand, in particular for dental implements, which consists of a carrier possessing holders for the dental implements of instruments.

2. Discussion of the Prior Art

An equipment stand of that type has become known from the publication "Dental Products Report" Jan.-/Feb. 1981, page 92. This known equipment stand for dental implements is constructed in a bracket or gallows-shape and possesses a base portion extending upwardly in a vertical direction from the table top of a work table or bench, and a horizontal arm continuing through a bend into the base portion. Provided at the free end of the horizontal arm is a separate horizontally extending cross-bar, which is transverse to the horizontal arm and which forms a carrier for the implement holders. Hereby, the implement holders are arranged sidewise adjacent each other on the carrier which is formed by the cross-bar. Besides possessing a relatively complex construction, there is hereby afforded a relatively difficult or retricted overview of the implements, which are contained in the holders, and a mutual hindrance is encountered during the depositing and withdrawing of the implements in and from the holders. For example, when an implement is constituted of a pressure gauge and the neighboring implement of a dental handpiece, this will block the view of the gauge, particularly from the side. On the other hand, there can easily be encountered confusions with regard to the implements which are located in the neighboring holders, in particular when this relates to differently operating detal handpieces.

SUMMARY OF THE INVENTION

Accordingly, it is an object of the present invention to ameliorate or eliminate the disadvantages encountered in prior art constructions, through the provision of an equipment stand of the above-mentioned type which, while affording a simple construction, avoids any hindrances during the depositing and withdrawing of the implements in and from the holders, and also ensures a good overview of the implements which are located in the holders.

The advantages attainable through the present invention can be essentially ascertained in that the column or stand which extends in a vertical direction, concurrently forms the carrier possessing the implement holders, so as to thereby eliminate a separate component as a carrier in the form of a cross-bar, and consequently avoids a complex construction. Furthermore, through a superimposed arrangement of the implement holders there is afforded a good overview of the implements which are located in the holders. Moreover, through the above-mentioned satisfactory superposition affording ready accessability thereto for handling there is avoided any hindrance during the depositing and withdrawing of the implements in and from the holders. Finally, there is also eliminated any mixups or confusion of implements, since it has been evidenced that the servicing person can more readily note the applicable arrangement of locations for holders which are provided in sequence in height, than for holders which are located sideways near each other.

BRIEF DESCRIPTION OF THE DRAWINGS

Further advantageous features and modifications of the invention can be ascertained from the following detailed description of exemplary embodiments thereof, taken in conjunction with the accompanying drawings; in which:

FIG. 1 illustrates a perspective view of an inventive equipment stand which is positioned on the table top of a work table;

FIG. 2 illustrates a perspective view of an equipment stand which is supported from a chamber wall;

FIGS. 3 through 5 respectively illustrate modified embodiments relative to that illustrated in FIG. 2;

FIG. 6 illustrates a sectional view taken along line VI—VI in FIG. 3 of a modified embodiment;

FIG. 7 illustrates an equipment stand with modified implement holders or instruments shown in a perspective view;

FIG. 8 illustrates a modified embodiment relative to that of FIG. 7;

FIG. 9 illustrates a fragmentary detail from FIG. 8;

FIG. 10 illustrates a perspective view of an equipment stand with horizontally or vertically pivotable implement holders;

FIG. 10a illustrates a pivotable equipment support as a receiving element for an implement constructed as technical handpiece, shown partly in section through the pivot axis and for the remainder in a plan view;

FIG. 11 illustrates a sectional view, as in FIG. 10, of a cantilever-like retaining element for an implement holder configured to provide an implement-forming illuminating member;

FIG. 12 illustrates a perspective view of the illuminating member in a plurality of pivoted positions;

FIG. 13 illustrates a sectional view through the illuminating member which is provided with a protective screen or shield;

FIG. 14 illustrates a plan view of the removably arranged illuminating member;

FIG. 16 illustrates a side elevational view of the equipment stand incorporating the receiving element for the gas burner;

FIG. 17 is a sectional view taken along line XVII—XVII in FIG. 16; and

FIG. 18 illustrates a fragmentary detail from FIG. 16.

DETAILED DESCRIPTION

Figure 15:
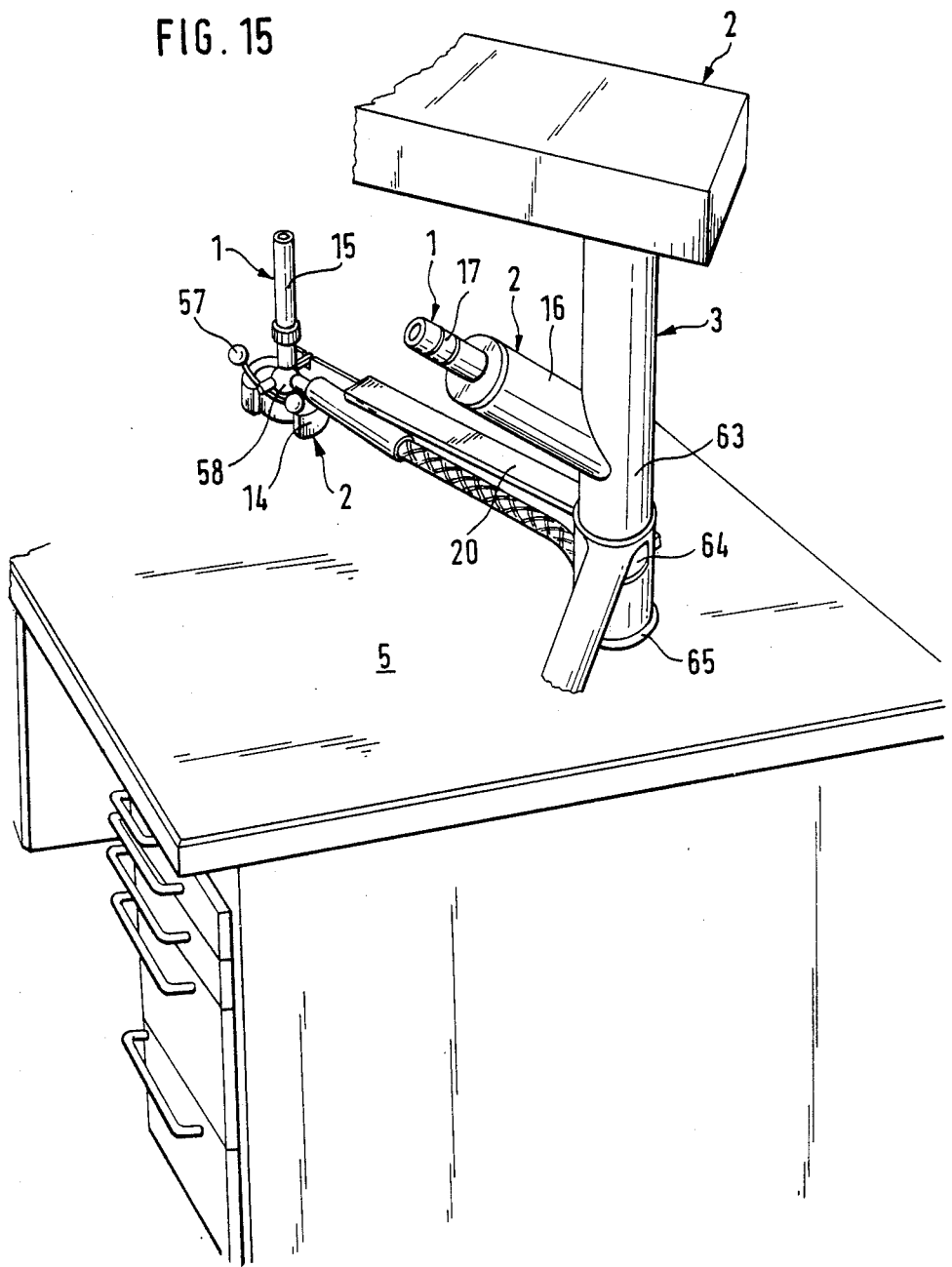
FIG. 15 illustrates a perspeective view of the implement holder formed as a receiving element for a gas burner constituting an implement.

Referring now in detail to the drawings, the illustrated equipment stand consists of a carrier or support 3 incorporating holders 2 for dental implements or instruments 1. The carrier 3 is constructed as a type of column exclusively extending in the vertical direction, whereby the implement holders 2 are arranged above each other.

The columnar support 3 is arranged so as to be rotatable about its vertical axis 4.

For instance, in the embodiment pursuant to FIGS. 1, 7, 8, 10, 15 and 16, the columnar support 3 is arranged on a table top 5 of a worktable or bench 6.

In the embodiment pursuant to FIGS. 2, 3, 4, and 5, the columnar support is mounted on a wall 8 of the work chamber. Hereby, the support 3 is fastened through the intermediary of a horizontal arm 7 to a wall 8 proximate the worktable 6. The columnar support can hereby be positioned without being supported on the table top, at a distance above the table top 5.

The implement holders 2 are presently pivotable either individually or commonly jointly with regard to the columnar support 3 about the axis 4 of the latter. For example, two implement holders 2 can be jointly pivotable about the axis 4 such that in the one pivoted end position of the implement retained by one implement holder is in its operative position, and the implement retained by the other implement holder is in its inoperative position. The reverse is then applicable in the other pivoted end position. With respect to the implements 1 which are currently located in their inoperative position, especially when this relates to a drill, cutter, or the like, there is no danger of any injury to the operating person.

For example, as is illustrated in FIG. 7, the jointly pivotable implement holders 2, in the illustrated case the two lower holders, can be arranged at the same height with a horizontal spacing between each other.

For instance, from FIGS. 1 and 7 there can be ascertained that the columnar support 3 consists of a plurality of column sections forming individual modules 9, and which possess a plurality of implement holders 2. The individual modules 9 are pivotable individually, or a plurality thereof jointly, about the axis 4 of the columnar support 3. For example, in order to adapt the equipment stand for an operating person who is left-handed, the individual modules 9 can be interchanged amongst each other; in effect, an individual module 9 can be positioned which possesses an instrument holder 2 suitable for a left-handed person.

The columnar support 3 is constructed hollow in order to be able to receive conduits 10; for example, energy supply or media conduits.

The implement holders 2 can be imparted a configuration which is suitably correlated for the receiving of different types of implements 1. Thus, a few of the implement holders 2 are formed as plug-shaped or bifurcated receiving elements 11 for removable technical handpieces 12 constituting the implements 1, with internally or externally arranged drive or supply conduits 13. To the extent that the conduit 13 is located externally, the guidance of the conduit leads from above downwardly so as to at all possibly avoid any disturbances or hindrances.

Other implment holders 2 are configured as bifurcated or tray-like receiving elements 14 for suitably detachable gas burners 15, for example, Bunsen burners, constituting the implements 1. The gas supply hose can be arranged interiorly of the support 3. At an extendable arrangement, the gas burner can be readily deposited on the table top 5.

In turn, other implement holders 2 are constructed as cup or cylinder-shaped receiving elements 16 for extendable air nozzles 17 constituting the implements 1, with a similarly extendable air supply hose 18. Hereby, the cylinder-like receiving elements 16 are located generally at the middle height of the columnar support 3. The arrangement is suitably such that, upon the pulling out or extending of the nozzle 17 from the cylindrical receiving element 16, there is automatically activated a suctioning device.

Furthermore, other implement holders 2 are constructed as tablet-shaped receiving element 19 for work tools, work materials, operating media or the like, forming the implements 1. The bifurcated or pan-shaped receiving elements 14 can be structurally combined with the tablet-shaped receiving elements 19.

As illustrated in the drawing, the implement holders are presently supported by means of a radial, horizontal carrying arm 20 on the columnar support 3.

As can be ascertained, for example from FIG. 6, a plurality, in this instance two carrying arms 20, are rigidly interconnected and jointly pivotable about the axis 4 of the columnar support 3. The carrying arms 20 can, however, also be individually pivotable about the axis 4.

The implement holders 2 can be arranged on the columnar support 3 so as to be extendable in a horizontal direction. For this purpose, the implement holders 2 can be, for example, for interchanging with each other, presently detachably mounted on the carrying arms 20 (FIG. 4).

As can be ascertained from FIGS. 3 and 4, at least the end of an extension arm 7 which is fastened to a wall 8 is pivotable about a vertical axis 21. Also possible is to provide for pivoting about a horizontal axis (not shown).

In the embodiment pursuant to FIG. 4, the extension arm 7 consists of two parallel arms 22 forming a parallelogram linkage, of which each is pivotable at its two ends about a verical axis 21. The vertical pivot axis 21 can have detachable latching means 23 associated therewith for the adjusted pivoted position of the extension arm 7.

In the embodiment pursant to FIG. 5, the end 24 of the extension arm 7 which is remote from the columnar support 3 is constructed as a carriage which is supported for reciprocation in a horizontal guide rail 25. The guide rail 25 can be mounted on a chamber wall 8 or on the chamber ceiling, or on a frame structure. As is further illustrated in FIG. 5, locking means 26 are associated with the carriage-like end 24 of the extension arm 7 and/or the guide rail 25.

As is illustrated, for example in FIG. 3, the extension arm 7 is constructed so as to be extendable in a horizontal direction. For this purpose, the extension arm 7 is constructed telescopically and is provided with a telescope tube 27, as well as a telescope arm 28 which is supported for reciprocation within the telescope tube 27. The telescope tube 27 and the telescope arm 28 each possess a rectangular cross section. In a similar manner, especially as illustrated in FIG. 6, the carrying arms 20 can be constructed so as to be telescopically extensible.

In the embodiment pursant to FIG. 7, one of the implement holders 2 is constructed as a receiving element for a board or panel-like control or regulating element 29 constituting an implement 1. The regulating or control element 29 possesses setting or regulating and control means, as well as display components.

In the embodiment according to FIG. 8, one of the implement holders 2 is shaped as a gallows-like or bracketed receiving element 30 arranged at the upper end of the columnar support 3 for a motor 31 in this technology consituting an implement 1. The electrical current supply cable 31a leading to the motor 31 is connected by means of a socket plug 31b with the corresponding current supply element in the columnar support 3.

One of the implement holders 2 is shaped as a cantilever-like horizontal retainer element 32 at the upper end of the columnar support 3 for a horizontal illuminating member 33 constituting an implement 1. The implement holders 2 are latchable in the presently assumed pivoting position or in a preferred pivoting positon. For this purpose, in the configuration of the implement holder 2 as a cantilever-like retainer element 32, this element includes a circular bearing recess 34 for the horizontally pivotable support of the columnar support 3 which is also circular in cross section. From FIG. 11, there may be further ascertained that the cantilever-like retainer element 32 possesses a double-armed latching lever 36 which is tiltable about a vertical axis 35, whose one end is pressure actuatable from externally in the sense of an effected tilting opposite to the action of a resetting spring 37 whereby, during this tilting which is effected about the axis 35, a latching element 41 is movable out of a locking position 40, which latching element is provided at the other end of the latching lever 36 and extends through an opening 38 in the edge 39 of the bearing recess 34 in the latching position, into the latching recess 40 of the columnar support 3 corresponding to the preferred pivoting position. The cnatilever-like retainer element 32 is hereby of a hollow construction, whereby the latching lever 36 which is arranged interiorly of the hollow latching element 32 incorporates an externally accessible pressure element 42 for pressure actuation, such as a push-button. In order to limit the pivoting angle of the implement holder 2, which may be, for example, somewhat less than 360°, pursuant to FIG. 11, stop means 43 may be associated with the holder and the columnar support 3.

The embodiment pursuant to FIG. 10 distinguishes itself in that in the configuration of the implement holder 2 as a horizontal pivotable carrying arm 20 which supports at its free end a receiving element 11 for a technological handpiece 12, the receiving element 11 is supported on the carrying arm so as to be pivotable about a horizontal axis 44 extending transversely to the longitudinal extension of the carrying arm 20, wherein the receiving element 11 is connected in such a manner with the free end of a connecting rod 45 which has its other end fastened to the columnar support 3, that upon the displacement of the carrying arm 20 from an operative position A in which the receiving element 11 is also located in the operative position into an inopertive position B, the receiving element 11 is also automatically movable into an inoperative position through pivoting about the axis 44. In the current inoperative positions there is thus avoided any otherwise possible danger of injury through the deposited or stored implement, for example, a dental drill, and also avoided other hindrances or disruptions.

The illuminating member 33 which is arranged at the free end of the cantilever-like retainer element 32, pursuant to FIGS. 10, 12, and 13, is pivotable about a horizontal axis 46 of the retainer element which extends transversely of the longitudinal extent of the retainer element 32. In FIG. 12 there are indicated a few pivot positions through the angles α and β. In the set pivoted positions, the illuminating member 33 can be fixed by means of a latching device. For this purpose, the axle 46 is constructed hollow such that, for forming the latching arrangement 47, on the one hand, within hollow axle 46 there is arranged a pressure rod 51 provided with an inclined surface 50, which is movable opposite the effect of a resetting spring 48 by means of an externally projecting handgrip 49 from a latching position into a release position and, on the other hand, locking members 53 are supported in cutouts 52 in the hollow axle 46, which in the latching position thereof are pressed by the inclined surface 50 against the bearing wall 54 of the illuminating member 33 which encompasses the hollow axle to thereby prevent any displacement of the illuminating member which, in the released position thereof, due to the moving away of the inclined surface 50 is no longer pressed against the bearing wall 54, so as to now facilitate the displacement of the illuminating member 33. The handgrip 49 is suitably formed by a push-button. The locking members 53 are constituted of locking balls which are engageable into latching cutouts 55 in the bearing wall 54.

The inclined surface 50 is formed by a conical section of the pressure rod 51. In order to afford the supply of electrical current to the illuminating member 33 in all pivoted positions thereof, cooperating slide contacts 56 are provided on the retainer element 32 as well as on the illuminating member 33.

As is illustrated in FIG. 14, the illuminating member 33 is arranged on the retainer element 32 so as to be removable therefrom in the direction of its pivoting axis 46.

Provided on the illuminating member 33 is a protective shield 33a which is constructed of a transparent material. The protective shield 33a is pivotable about a horizontal axis 33b relative to the illuminating member 33.

The protective sheild 33a, pursuant to FIG. 10, can be moved into such a position as to protect the head of a person, usually seated in front of the work table 6, from foreign bodies, for example filings or cuttings, liquids or the like produced during the finishing of workpieces. This workpiece processing primarily takes place on a work block 66, as illustrated in FIG. 10, which can be formed by a filing vice. The work block 66 can be provided with a suctioning device for aspirating grinding dust or the like. An armrest 67 is located at respectively both sides of the work block 66.

The gas bruner 15 which, in accordance with FIG. 15, is arranged in the bifurcated or pan-shaped receiving element 14, possesses a regulating valve 58 which is provided with an adjusting element 57, so as to facilitate an adjustment of the gas burner from an "on" position; in effect, an operating flame, to pilot light or an "off" position.

FIGS. 15 through 18 further illustrate that with a configuration of the implement holder 2 as a horizontally pivotable carrying arm 20 which at its free end includes a receiving element 14 for the gas burner 15, the adjusting element 57 for the gas burner regulating valve 58 is connected in such a manner with the free end of a control rod 59 fixed at its other end to the columnar support 3, that upon the pivoting of the carrying arm 20 from an operative position C into an inoperative position D, the adjusting element 57 is in turn automatically movable from an operative position facilitating the full burning flame into an inoperative position which will provide only a pilot light or no flame at all. Hereby the setting or adjusting element 57 of the gas burner regulating vlave 58 is guided in a latching guide 61 possessing a plurality of resilient latching positions 60. The latching guide 61, pursuant to FIG. 18, is formed by two oppositely located wavilinear lataching springs 68 in conformance with the latching positions 60. Also, arranged on the carrying arm 20 is a guide track 62 for the control rod 59. The adjusting element 57 of the gas burner regulating valve 58 is formed in the type of a double-armed pivot lever which is guided in the latching guide 61.

In detail, the columnar support 3 consists of a hollow stand 63 which is circular in cross section, on which bearing rings 64 carrying the carrying arms 20 are rotatably supported. These bearing rings 64 correspond to the above-mentioned individual modules 9. For its positioning on the table top 5 of a work table 6, the columnar support 3, in effect, the stand 63, incorporates socket 65 at its lower end.

What is claimed is:

1. In an equipment stand for dental implements; including support means mounting holders for the implements arranged on said support means, said support means being supported from a wall and being horizontally pivotable; said support means having an extension arm, an end of said extension arm being supported from said wall for pivoting about a vertical axis; the improvement comprising: said support means mounting said implement holders being a vertically extending column rotatable about the longitudinal axis thereof at a distance from said wall, said implement holders being directly rotatably mounted on said column and being arranged superimposed vertically above each other.

2. Equipment stand as claimed in claim 1, wherein the columnar support means is arranged above the table top of a work table.

3. Equipment stand as claimed in claim 1, wherein the extension arm comprises two parallel arms forming a parallelogram linkage, each said arm being pivotable at both ends thereof about a vertical pivoting axis.

4. Equipment stand as claimed in claim 1, wherein said vertical pivoting axis includes releasble latching means for the pivoted position assumed by the extension arm.

5. Equipment stand as claimed in claim 1, wherein the end of the extension arm distant from said columnar support means comprises a carriage supported in a guide rail for reciprocating movement.

6. Equipment stand as claimed in claim 5, wherein the carriage-shaped end of the extension arm and the guide rail have latching means associated therewith.

7. Equipment stand as claimed in claim 1, wherein said etension arm is extendably constructed.

8. Equipment stand as claimed in claim 7, wherein the extension arm comprises a telescopable structure including a telescope tube, and a telescope arm supported for reciprocation within said telescope tube.

* * * * *

UNITED STATES PATENT AND TRADEMARK OFFICE
CERTIFICATE OF CORRECTION

PATENT NO. : 4,934,766            Page 1 of 2

DATED : June 19, 1990

INVENTOR(S) : Helmut Schmidt, et al.

It is certified that error appears in the above-identified patent and that said Letters Patent is hereby corrected as shown below:

Column 1, line 14: "of" should read as --or--

Column 1, line 42: "detal" should read as --dental--

Column 2, line 49: "perspeective" should read as --perspective--

Column 3, line 55: "implment" should read as --implement--

Column 4, line 10: "holders are" should read as --holders 2 are--

Column 4, line 37: "pursant" should read as --pursuant--

Column 4, line 56: "pursant" should read as --pursuant--

Column 5, line 26: "cnatilever-like" should read as --cantilever- like--

Column 6, line 33: "sheild" should read as --shield--

Column 6, line 44: "bruner" should read as --burner--

UNITED STATES PATENT AND TRADEMARK OFFICE
CERTIFICATE OF CORRECTION

PATENT NO. : 4,934,766

DATED : June 19, 1990

INVENTOR(S) : Helmut Schmidt, et al.

It is certified that error appears in the above-identified patent and that said Letters Patent is hereby corrected as shown below:

Column 6, line 65: "vlave" should read as --valve

Column 6, line 68: "lataching" should read as --latching--

Column 8, line 11, Claim 4: "releasble" should read as --releasable--

Column 8, line 17, Claim 5: "reciporcating" should read as --reciprocating--

Column 8, line 22, Claim 7: "etension" should read as --extension--

Signed and Sealed this

Second Day of July, 1991

Attest:

*Attesting Officer*

HARRY F. MANBECK, JR.

*Commissioner of Patents and Trademarks*